(12) United States Patent
Du et al.

(10) Patent No.: US 11,249,332 B2
(45) Date of Patent: Feb. 15, 2022

(54) LIQUID CRYSTAL DISPLAY DEVICE AND DRIVE METHOD THEREOF

(71) Applicants: BOE Technology Group Co., Ltd., Beijing (CN); Hefei Xinsheng Optoelectronics Technology Co., Ltd., Anhui (CN)

(72) Inventors: Ruifang Du, Beijing (CN); Zijun Cao, Beijing (CN); Yuanyuan Liu, Beijing (CN); Xiaoye Ma, Beijing (CN); Rui Ma, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 746 days.

(21) Appl. No.: 16/071,657

(22) PCT Filed: Dec. 15, 2017

(86) PCT No.: PCT/CN2017/116505
§ 371 (c)(1),
(2) Date: Jul. 20, 2018

(87) PCT Pub. No.: WO2018/192248
PCT Pub. Date: Oct. 25, 2018

(65) Prior Publication Data
US 2021/0173246 A1 Jun. 10, 2021

(30) Foreign Application Priority Data
Apr. 21, 2017 (CN) .......................... 201710266661.2

(51) Int. Cl.
*G02F 1/133* (2006.01)
*G02F 1/1345* (2006.01)
*G02F 1/1362* (2006.01)

(52) U.S. Cl.
CPC ...... *G02F 1/13306* (2013.01); *G02F 1/13452* (2013.01); *G02F 1/136286* (2013.01); *G02F 2203/30* (2013.01)

(58) Field of Classification Search
CPC .................................................. G02F 1/13306
See application file for complete search history.

(56) References Cited

U.S. PATENT DOCUMENTS 6,744,032 B1 6/2004 Tay
2009/0109358 A1* 4/2009 Tanaka .............. G02F 1/134363
349/38

(Continued)

FOREIGN PATENT DOCUMENTS

CN 106328094 * 1/2007 ......... G02F 1/13357
CN 101083774 A 12/2007

(Continued)

OTHER PUBLICATIONS

May 7, 2019—(CN) First Office Action 201710266661.2 with English Translation.

(Continued)

*Primary Examiner* — Sang V Nguyen
(74) *Attorney, Agent, or Firm* — Banner & Witcoff, Ltd.

(57) ABSTRACT

A liquid crystal display device and a drive method thereof are disclosed. The liquid crystal display device includes a display panel and a controller. The display panel includes a display region, a plurality of pixels arranged in a matrix are provided in the display region, each of the plurality of pixels includes a red sub-pixel, a blue sub-pixel and a green sub-pixel, and the display region includes a middle portion and a peripheral portion outside the middle portion, and at least one first pixel is provided in the peripheral portion, the controller is configured to relatively increase a luminous intensity of a blue sub-pixel in the first pixel.

20 Claims, 6 Drawing Sheets

(56) References Cited

U.S. PATENT DOCUMENTS

| | | | |
|---|---|---|---|
| 2013/0321497 A1* | 12/2013 | Kang | G09G 3/3648 345/694 |
| 2014/0375703 A1* | 12/2014 | Ban | G09G 3/3688 345/691 |
| 2015/0042691 A1 | 2/2015 | Gong et al. | |
| 2016/0238905 A1* | 8/2016 | Han | G02F 1/133707 |
| 2017/0077191 A1 | 3/2017 | Hwang et al. | |
| 2018/0122296 A1* | 5/2018 | Lee | G09G 5/06 |

FOREIGN PATENT DOCUMENTS

| | | | |
|---|---|---|---|
| CN | 106205506 | * 12/2007 | G09G 3/34 |
| CN | 102682732 A | 9/2012 | |
| CN | 102937763 A | 2/2013 | |
| CN | 103578444 A | 2/2014 | |
| CN | 106205506 A | 12/2016 | |
| CN | 106328094 A | 1/2017 | |
| CN | 106873205 A | 6/2017 | |
| KR | 1020120039453 A | 4/2012 | |

OTHER PUBLICATIONS

Mar. 20, 2018—(WO) International Search Report and Written Opinion Appn PCT/CN2017/116505 with English Translation.

* cited by examiner

LIQUID CRYSTAL DISPLAY DEVICE AND DRIVE METHOD THEREOF

CROSS-REFERENCE TO RELATED APPLICATION

The application is a U.S. National Phase Entry of International Application No. PCT/CN2017/116505 filed on Dec. 15, 2017, designating the United States of America and claiming priority to Chinese Patent Application No. 201710266661.2, filed on Apr. 21, 2017. The present application claims priority to and the benefit of the above-identified applications and the above-identified applications are incorporated by reference herein in their entirety.

TECHNICAL FIELD

Embodiments of the present disclosure relate to a liquid crystal display device and a drive method thereof.

BACKGROUND

A liquid crystal display (LCD) technology is a relatively mature display technology at present. A liquid crystal display device is formed by using the liquid crystal display technology, and the liquid crystal display device has become a mainstream in display devices due to advantages of high image quality, power saving, thin body and wide application range and the like. With development of display technology, a narrow frame liquid crystal display panel has become a trend in the development of the liquid crystal display device. At present, in a process of preparing a liquid crystal display panel, the liquid crystal display panel is easily deformed in a vacuum breaking process and a cutting process, resulting in uneven thicknesses at edges and in a middle part of the liquid crystal display panel, further causing undesirable phenomena such as yellowing at the edges of the liquid crystal display panel and so on, so that a display effect of the liquid crystal display panel is affected and display quality is lowered.

SUMMARY

At least one embodiment of the present disclosure provides a liquid crystal display device, which comprises a display panel and a controller. The display panel comprises a display region, a plurality of pixels arranged in a matrix are provided in the display region, each of the plurality of pixels comprises a red sub-pixel, a blue sub-pixel and a green sub-pixel, and the display region comprises a middle portion and a peripheral portion outside the middle portion, and at least one first pixel of the plurality of pixels is provided in the peripheral portion. In an operation of the liquid crystal display device, the controller is configured to relatively increase a luminous intensity of a blue sub-pixel in the first pixel.

For example, the liquid crystal display device provided by at least one embodiment of the present disclosure further comprises: a plurality of data lines and a data drive circuit. The controller includes a signal control circuit, the plurality of data lines include a first data line, a second data line and a third data line, the first data line is connected with the blue sub-pixel in the first pixel, and the second data line is connected with a red sub-pixel in the first pixel, and the third data line is connected with a green sub-pixel in the first pixel; the data drive circuit is configured to apply data signals to the plurality of data lines; and the signal control circuit is arranged between the data drive circuit and the plurality of data lines, and is configured to control magnitude of the data signals transmitted from the plurality of data lines to the first pixel, so as to adjust luminous intensities of respective sub-pixels in the first pixel.

For example, in the liquid crystal display device provided by at least one embodiment of the present disclosure, the signal control circuit includes an amplifier, an input terminal of the amplifier is connected with the data drive circuit, an output terminal of the amplifier is connected with the first data line, and the amplifier is configured to amplify a data signal applied to the first data line.

For example, in the liquid crystal display device provided by at least one embodiment of the present disclosure, the signal control circuit includes a first transistor and a second transistor, an input terminal and an output terminal of the first transistor are connected with the data drive circuit and the second data line respectively; an input terminal and an output terminal of the second transistor are connected with the data drive circuit and the third data line respectively; control terminals of the first transistor and the second transistor are configured to be applied with control voltages to respectively adjust magnitude of the data signals applied to the second data line and the third data line.

For example, in the liquid crystal display device provided by at least one embodiment of the present disclosure, at least one second pixel of the plurality of pixels is further provided in the peripheral portion or the middle portion, the plurality of data lines extend along a column direction of the plurality of pixels and further include a fourth data line, a blue sub-pixel of the second pixel and the blue sub-pixel of the first pixel are in a same column, and the fourth data line is connected with the blue sub-pixel in the second pixel.

For example, in the liquid crystal display device provided by at least one embodiment of the present disclosure, at least one second pixel of the plurality of pixels is further provided in the peripheral portion or the middle portion, the plurality of data lines extend in a column direction of the plurality of pixels and further include a fifth data line and a sixth data line, the second pixel and the first pixel are in a same column, the fifth data line is connected with a red sub-pixel in the second pixel, and the sixth data line is connected with a green sub-pixel in the second pixel.

For example, in the liquid crystal display device provided by at least one embodiment of the present disclosure, the controller is connected with a dynamic backlight source, the dynamic backlight source includes a blue light unit corresponding to the blue sub-pixel in the first pixel, and the blue light unit is configured to have a relatively increased luminous intensity.

For example, in the liquid crystal display device provided by at least one embodiment of the present disclosure, the controller further includes a backlight source drive circuit, the backlight source drive circuit is connected with the dynamic backlight source, the backlight source drive circuit is configured to control the blue light unit to emit light, so that the blue light unit has the relatively increased luminous intensity with respect to other backlight units in the dynamic backlight source.

For example, in the liquid crystal display device provided by at least one embodiment of the present disclosure, the controller includes a data drive circuit, the data drive circuit is configured to transmit a relatively increased grayscale voltage to the blue sub-pixel in the first pixel.

For example, in the liquid crystal display device provided by at least one embodiment of the present disclosure, the data drive circuit includes a voltage drive circuit and a gamma voltage circuit, the gamma voltage circuit is configured to generate a grayscale voltage according to input display data, and the voltage drive circuit is configured to relatively increase the grayscale voltage transmitted to the blue sub-pixel in the first pixel.

At least one embodiment of the present disclosure provides a drive method for any one of the above-described liquid crystal display devices. The drive method comprises: increasing a luminous intensity of the blue sub-pixel in the first pixel, and/or reducing luminous intensities of other sub-pixels in the first pixel than the blue sub-pixel, so as to relatively increase the luminous intensity of the blue sub-pixel in the first pixel with respect to the other sub-pixels in the first pixel.

For example, in the drive method provided by at least one embodiment of the present disclosure, the drive method comprises increasing a data signal applied to a data line connected with the blue sub-pixel in the first pixel.

For example, in the drive method provided by at least one embodiment of the present disclosure, the drive method comprises reducing data signals applied to data lines connected with the other sub-pixels in the first pixel.

For example, in the drive method provided by at least one embodiment of the present disclosure, in a case where the liquid crystal display device comprises a dynamic backlight source, the dynamic backlight source includes a blue light unit corresponding to the blue sub-pixel in the first pixel, the drive method comprises controlling the blue light unit to emit light, so that the blue sub-pixel in the first pixel has an increased luminous intensity with respect to the other sub-pixels in the first pixel.

For example, in the drive method provided by at least one embodiment of the present disclosure, the drive method comprises increasing a grayscale voltage transmitted to the blue sub-pixel in the first pixel.

It is to be understood that the above general description of the present disclosure and the following detailed description are both illustrative and explanatory, and are intended to further illustrate the present disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
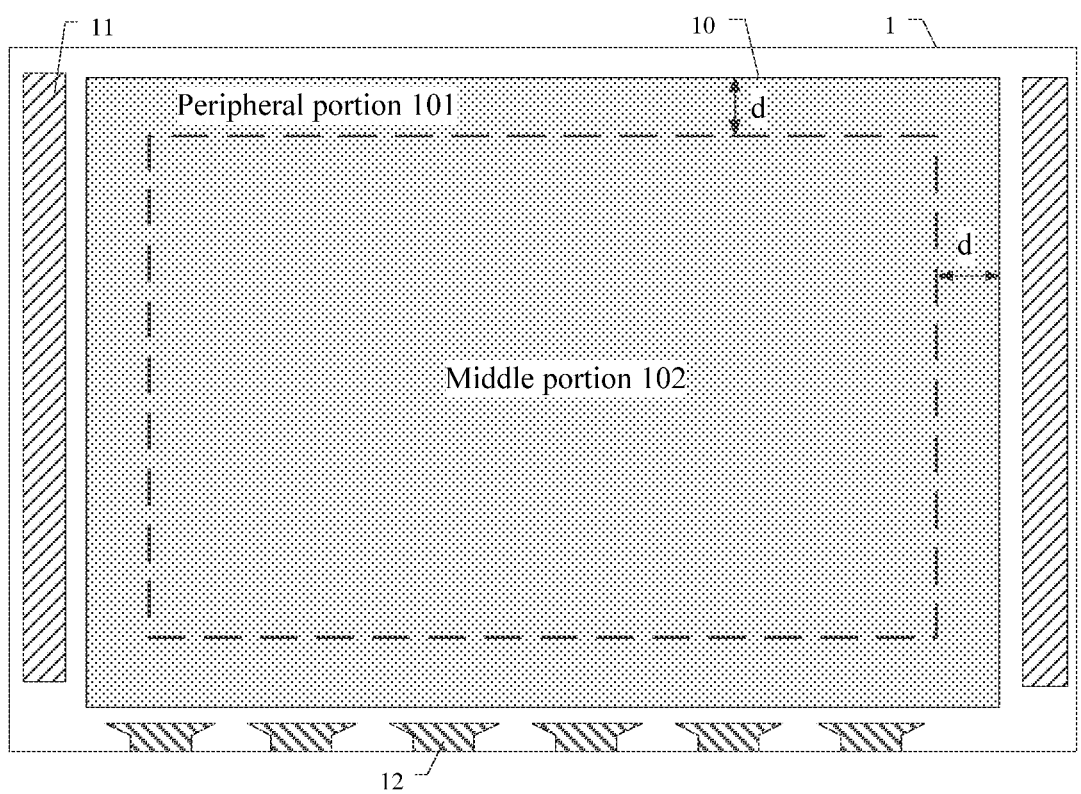
FIG. 1 is a plan schematic diagram of a liquid crystal display device provided by an embodiment of the present disclosure.

In order to make objects, technical details and advantages of the embodiments of the disclosure apparent, the technical solutions of the embodiments of the disclosure will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Each component or structure in the drawings is not drawn in strict accordance with the proportion of rendering, for clarity, the size of each component or structure may be exaggerated or reduced, but these should not be used to limit the scope of the present disclosure. In order to make the following description of the embodiments of the present disclosure clear and concise, the present disclosure omits detailed description of known functions and known components.

With development of display technology, a narrow frame is a development trend of a display device. In a process of preparing a liquid crystal display device, a liquid crystal display panel is easily deformed, resulting in that a peripheral portion and a middle portion of the liquid crystal display panel have inconsistent thicknesses, further causing undesirable phenomenon such as display yellowing in the peripheral portion of the liquid crystal display panel. For an ultra-narrow frame display product, for example, for an ultra-narrow frame liquid crystal display device where a gate driver is integrated in a liquid crystal display panel (Gate Driver on Array (GOA)), due to uneven thickness of a liquid crystal cell, the phenomenon such as display yellowing in the peripheral portion of the liquid crystal display device is more severe, so that a display effect is affected and display quality is reduced.

At least one embodiment of the present disclosure provides a liquid crystal display device and a drive method thereof. The liquid crystal display device comprises a display panel and a controller. The display panel comprises a display region, a plurality of pixels arranged in a matrix are provided in the display region, each of the plurality of pixels comprises a red sub-pixel, a blue sub-pixel and a green sub-pixel, and the display region comprises a middle portion and a peripheral portion outside the middle portion, and at least one first pixel of the plurality of pixels is provided in the peripheral portion, and the controller is configured to relatively increase a luminous intensity of a blue sub-pixel in the first pixel.

In the liquid crystal display device, a luminous intensity of a first pixel in the peripheral portion of the display region may be controlled separately, and a luminous intensity of a blue sub-pixel in the first pixel may be relatively increased with respect to other sub-pixels in the first pixel, and since blue light and yellow light are complementary to each other, and form white light after being superimposed, therefore, blue light component that is relatively increased may counteract yellow light generated in the yellowing peripheral portion, thereby reducing or eliminating color shift of a display image in the peripheral portion, so that display effect of the peripheral portion of the display panel is improved, display quality of the liquid crystal display panel is improved, and a yield of the liquid crystal display device is increased.

It should be noted that, in the description of the embodiments of the present disclosure, "relatively increase" includes increasing a luminous intensity of a blue sub-pixel in a pixel in a case where luminous intensities of sub-pixels of other colors in the pixel are maintained at a predetermined normal grayscale, or, reducing luminous intensities of sub-pixels of other colors (for example, a red sub-pixel and a green sub-pixel) in a pixel in a case where a luminous intensity of a blue sub-pixel in the pixel is maintained at a predetermined normal grayscale, or further, increasing a luminous intensity of a blue sub-pixel in a pixel with respect to a predetermined normal grayscale while reducing luminous intensities of sub-pixels of other colors in the pixel than the blue sub-pixel with respect to a predetermined normal grayscale. Here, the "predetermined normal grayscale" refers to a grayscale that should be shown by the pixel of the display device before the processing operation in the embodiment of the present disclosure is performed to avoid a problem of yellowing in the peripheral portion. For example, when an image is displayed, a luminous intensity of a blue sub-pixel is greater than a predetermined luminous intensity thereof; and/or luminous intensities of a red sub-pixel and a green sub-pixel are less than predetermined luminous intensities thereof.

In the following description of the present disclosure, a first direction is a column direction, a second direction is a row direction, and the first direction and the second direction are perpendicular to each other. "Perpendicular" may mean strictly perpendicular, or may also mean approximately perpendicular.

Several embodiments of the present disclosure are described in details below, but the present disclosure is not limited to these specific embodiments.

Figure 2:
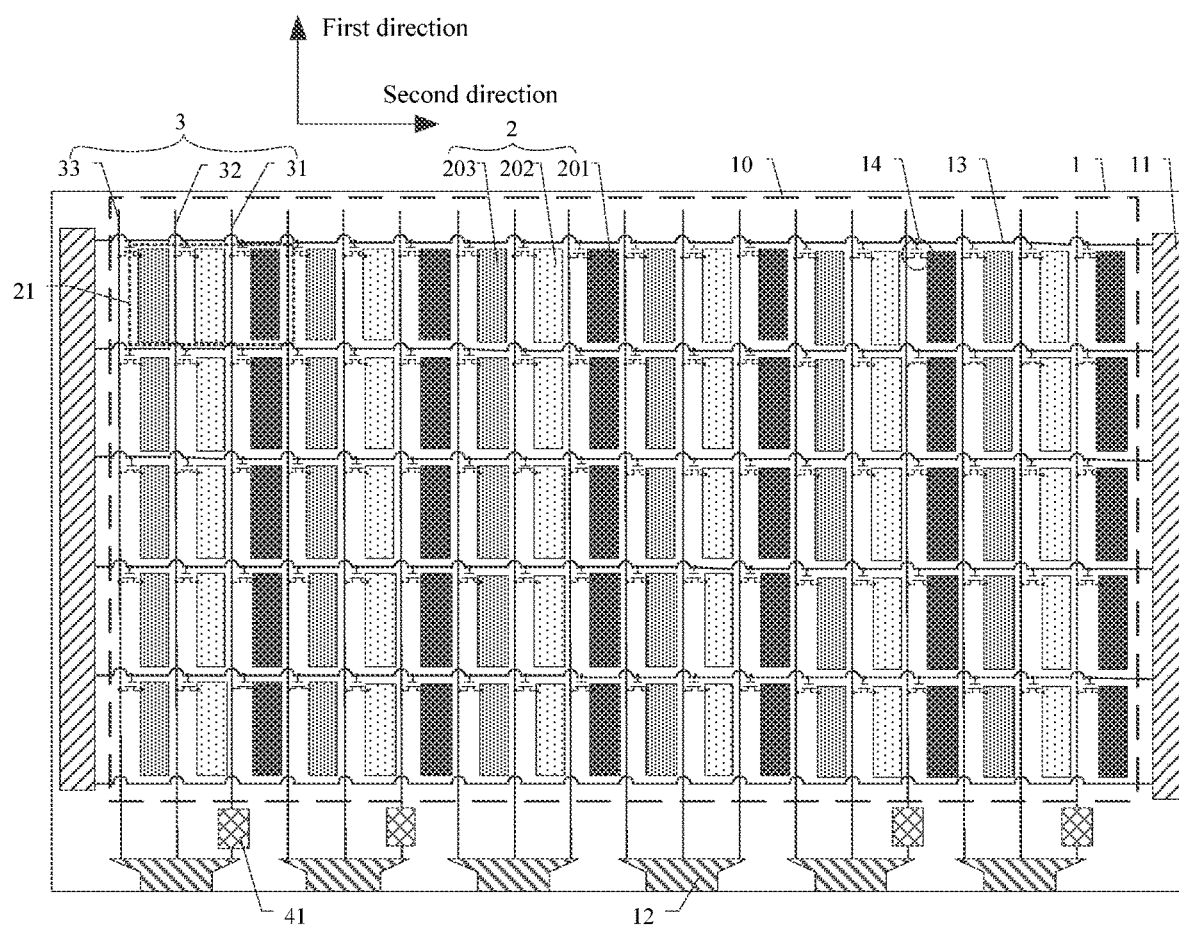
FIG. 2 is a structural schematic diagram of a liquid crystal display device provided by an example of an embodiment of the present disclosure.
Figure 3:
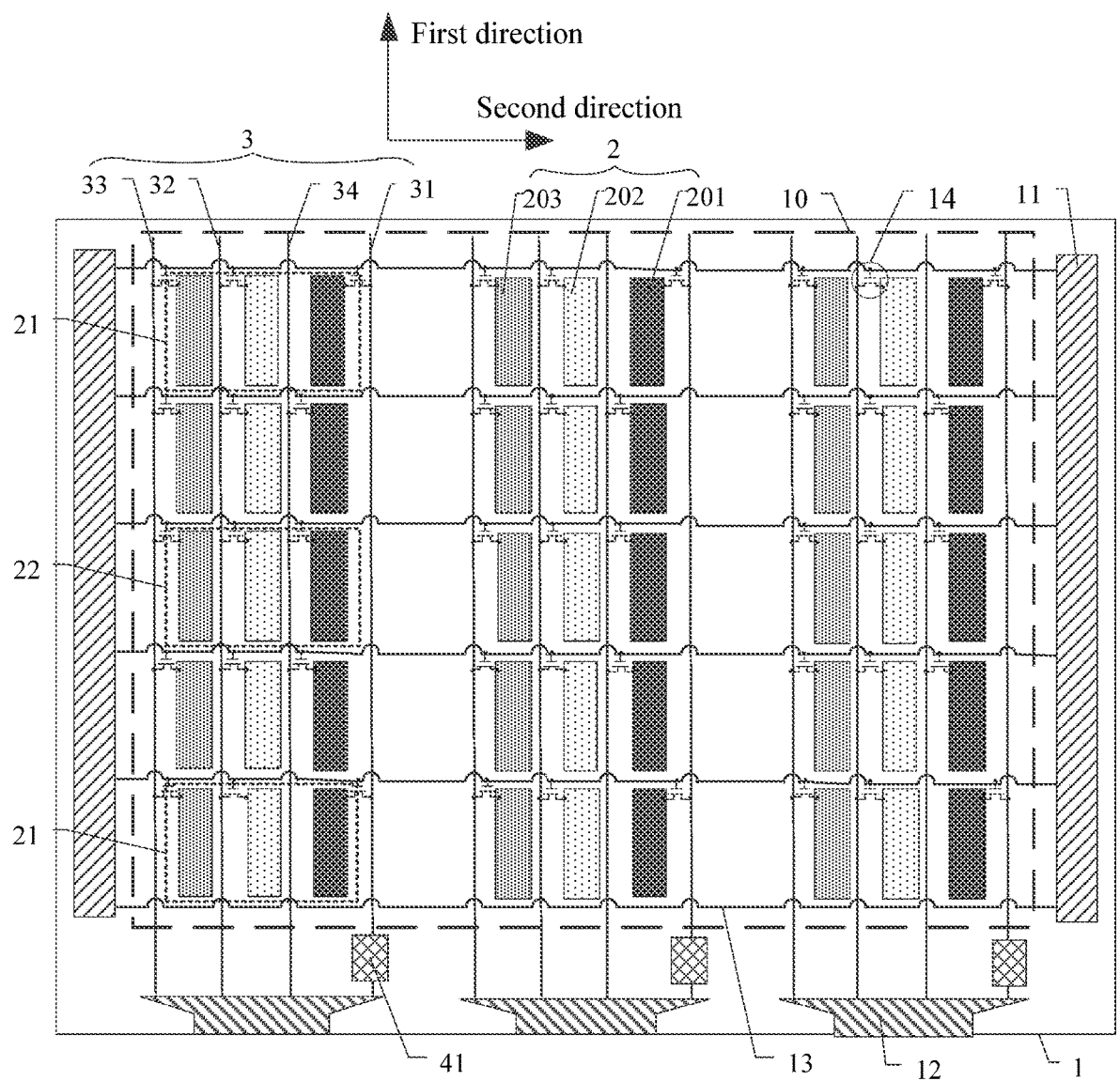
FIG. 3 is a structural schematic diagram of another liquid crystal display device provided by an example of an embodiment of the present disclosure.

An embodiment of the present disclosure provides a liquid crystal display device, FIG. 1 is a plan schematic diagram of a liquid crystal display device provided by an embodiment of the present disclosure; FIG. 2 is a structural schematic diagram of a liquid crystal display device provided by an example of an embodiment of the present disclosure; FIG. 3 is a structural schematic diagram of another liquid crystal display device provided by an example of an embodiment of the present disclosure.

For example, as shown in FIGS. 1 and 2, the liquid crystal display device comprises a display panel 1 and a controller. The display panel 1 comprises a display region 10, a plurality of pixels 2 arranged in a matrix of n rows×m columns (e.g., 720 rows×1080 columns) are provided in the display region 10, each pixel 2 includes a blue sub-pixel 201, a red sub-pixel 202 and a green sub-pixel 203, the display region 10 includes a middle portion 102 and a peripheral portion 101 arranged outside the middle portion 102 (e.g., around the middle portion 102), and at least one first pixel 21 of the plurality of pixels 2 is provided in the peripheral portion 101. The controller is configured to relatively increase a luminous intensity of a blue sub-pixel 201 in the first pixel 21, thus, in an operation of the liquid crystal display device, the luminous intensity of the blue sub-pixel 201 in the first pixel 21 may be relatively increased with respect to other (color) sub-pixels in the first pixel 21.

In the liquid crystal display device, a luminous intensity of a first pixel in the peripheral portion of the display region may be controlled separately, and a luminous intensity of a blue sub-pixel in the first pixel may be relatively increased with respect to the other sub-pixels in the first pixel. Because blue light and yellow light are complementary to each other and form white light after being superimposed, therefore, blue light component that is relatively increased may counteract yellow light generated in the yellowing peripheral portion, thereby effectively ameliorating undesirable phenomena such as yellowing in the peripheral portion of the liquid crystal display panel, and thus a display effect and display quality of the liquid crystal display panel is improved, and a yield of the liquid crystal display device is increased.

For example, as shown in FIG. 1, the middle portion 102 is located in middle of the display panel 1, the peripheral portion 101 is located around the display panel 1, and the middle portion 102 is surrounded by the peripheral portion 101.

For example, a distance d from an edge of the middle portion 102 to an edge of the display region closest to the edge of the middle portion 102 is 3 mm to 5 mm, for example, d may be selected to be 3 mm, 4 mm, or 5 mm.

For example, in the embodiment of the present disclosure, a green sub-pixel 203, a red sub-pixel 202 and a blue sub-pixel 201 in a pixel 2 are arranged in a same row. However, the present disclosure is not limited thereto, respective sub-pixels in the pixel 2 may also be arranged in a same column, or arranged in a triangle (Δ) or a mosaic manner, etc, and the arrangement manner of respective sub-pixels is not limited by the embodiments of the present disclosure.

For example, as shown in FIG. 2, the liquid crystal display device further comprises a plurality of data lines 3, and the plurality of data lines 3 extend along a first direction (i.e., a column direction). The plurality of data lines 3 include a first data line 31, a second data line 32 and a third data line 33, the first data line 31 is connected with the blue sub-pixel 201 in the first pixel 21, the second data line 32 is connected with a red sub-pixel 202 in the first pixel 21, and the third data line 33 is connected with a green sub-pixel 203 in the first pixel 21.

For example, the liquid crystal display device further comprises a data drive circuit 12. The data drive circuit 12 is configured to apply data signals to the plurality of data lines 3, and the data signals are voltage signals, and a data signal is used to control a luminous intensity of a corresponding sub-pixel in display to show a certain grayscale.

For example, the higher the voltage of the data signal is, the larger the grayscale is, and thereby the greater the luminous intensity of the sub-pixel is.

For example, the data drive circuit 12 may include a digital driver and an analog driver. The analog driver inputs a red, green, blue (RGB) analog signal, and then outputs the RGB analog signal to a pixel via a thin film transistor; and the digital driver inputs an RGB digital signal, and the digital signal is converted into an analog signal after being performed a D/A conversion and GAMMA correction in the driver, and then the analog signal is outputted to a pixel via a thin film transistor. Although a plurality of individual data drive circuits 12 are shown in the drawings, these data drive circuits 12, for example, may be integrated in a same driving chip, or may be a same circuit or the like.

For example, as shown in FIG. 2, the liquid crystal display device provided by the embodiment of the present disclosure further comprises a gate driver 11, each sub-pixel may include a switching transistor 14, and the gate driver 11 is electrically connected with switching transistors 14 of sub-pixels of respective rows through a plurality of gate lines 13, the gate driver 11 is configured to provide gate voltages to the switching transistors 14, so as to control working states of the switching transistors 14.

For example, in the embodiment of the present disclosure, the gate driver 11 may be integrated on the display panel 1, i.e., the liquid crystal display device adopts a GOA technology, so that production cost and power consumption may be effectively reduced, a bonding process is omitted, product yield and production capacity are improved, and a narrow frame of the display panel is achieved. The gate driver 11 may also be provided on a printed circuit board of the liquid crystal display device. In addition, the gate driver 11 may be provided on one side of the display panel, or the gate driver 11 may be provided on both sides of the display panel.

For example, the switching transistor 14 may be a thin film transistor. The thin film transistor may include an oxide thin film transistor, an amorphous silicon thin film transistor, a polysilicon thin film transistor or the like.

For example, each sub-pixel of the liquid crystal display device may further include a storage capacitor (not shown). The storage capacitor is used for holding a voltage of a pixel, which has been charged, to a scan phase of a next frame. For example, the storage capacitor may include a storage capacitor formed by a gate line (i.e., a $C_s$ on gate) or a storage capacitor formed by a common electrode line (i.e., $C_s$ on common); unlike the latter, the former does not require an additional common electrode line, so an aperture ratio thereof is larger. For example, the liquid crystal display device in the embodiment of the present disclosure adopts a $C_s$ on gate.

For example, the controller may include a signal control circuit, and the signal control circuit may be arranged between the data drive circuit 12 and the plurality of data lines 3, and the signal control circuit may be used for controlling magnitude of the data signals transmitted from the plurality of data lines 3 to the first pixel 21, so as to adjust luminous intensities of respective sub-pixels in the first pixel 21. For example, as shown in FIG. 2, in an example of the embodiment of the present disclosure, the signal control circuit includes at least one amplifier 41. The amplifier 41 may amplify a data signal applied to the first data line 31, thereby increasing a luminous intensity of the blue sub-pixel 201 in the first pixel 21. An input terminal of the amplifier 41 is connected with the data drive circuit 12, an output terminal of the amplifier 41 is connected with the first data line 31. For example, the amplifier 41 may receive a data signal from the data drive circuit 12, amplify the data signal, and then transmit the amplified data signal to the first data line 31. Finally, the amplified data signal is input to the blue sub-pixel 201 in the first pixel 21 through the first data line 31.

For example, the amplifier 41 may be connected with at least one first data line 31 to amplify a data signal applied to the first data line 31. Because the first data line 31 is connected with all the blue sub-pixels 201 located in a same column, the amplifier 41 may simultaneously increase luminous intensities of the blue sub-pixels 201 in all the first pixels 21 located in a same column. In a second direction, on left and right sides of the display panel 1, different amplifiers 41 may enhance the luminous intensities of the blue sub-pixels 201 in different columns, thereby ameliorating undesirable phenomenon of yellowing in a display image on the left and right sides of the display panel.

For example, the amplifiers 41 connected with the first data lines 31 in different columns may be different, so that luminous intensities of the blue sub-pixels 201 in different columns are enhanced by different extents. For example, for an area having a large degree of deformation in the display panel, the amplifier 41 may have a larger magnification ratio, thereby relatively greatly enhancing the luminous intensities of the blue sub-pixels 201 in the area. The amplifier 41 may be specifically designed according to values of the luminous intensities that the blue sub-pixels 201 in different areas need to increase. The amplifiers 41 connected with the first data lines 31 in different columns may also be the same, which is not limited by the embodiment of the present disclosure. It should be noted that, an area having a larger degree of deformation in the display panel may be an area where the yellowing in display is more severe, for example, may be an area of the peripheral portion 101 near the edge of the display region 10.

For example, one specific example of the amplifier 41 may consist of an electron tube, a transistor, a power transformer or other electrical components. For example, the amplifier 41 may be a single-stage coupled amplifier circuit or a multi-stage coupled amplifier circuit. The amplifier 41 may linearly or nonlinearly transform the input signal, to obtain different output signals. The linear transformation, for example, may include a linear function transformation and the like, and the nonlinear transformation may include an exponential transformation or a quadratic function transformation or the like.

For example, other specific examples of the amplifier 41 may be one or a combination of an electronic amplifier, an electromechanical amplifier, a hydrodynamic amplifier, a pneumatic amplifier and the like. The electronic amplifier, for example, may include an operational amplifier or the like. When the amplifier 41 is an operational amplifier, the data drive circuit 12 may be connected with a non-inverting input terminal of the operational amplifier.

For example, as shown in FIG. 3, at least one second pixel 22 of the plurality of pixels 2 is further provided in the peripheral portion 101 or the middle portion 102, the plurality of data lines 3 further include a fourth data line 34, and the fourth data line 34 also extends along the column direction, that is, extends along the first direction. The second pixel 22 and the first pixel 21 are in a same column but in different rows, and the fourth data line 34 is connected with a blue sub-pixel 201 in the second pixel 22; that is, the first data line 31 and the fourth data line 34 are connected with different blue sub-pixels 201 in the same column. Therefore, unlike the liquid crystal display device shown in FIG. 2, the liquid crystal display device shown in FIG. 3 may respectively control the blue sub-pixel 201 of the first pixel 21 and the blue sub-pixel 201 of the second pixel 22 in the same column, so as to separately enhance the luminous intensity of the blue sub-pixel 201 in the first pixel 21.

It should be noted that, the second pixel 22 and the first pixel 21 are operated differently. For example, a luminous intensity of the second pixel 22 is not adjusted; or, the luminous intensity of the second pixel 22 and a luminous intensity of the first pixel 21 are adjusted to different degrees. For example, the luminous intensity of the first pixel 21 and the luminous intensity of the second pixel 22 are increased simultaneously by the signal control circuit, however an increased amount of the luminous intensity of the first pixel 21 is greater than an increased amount of the luminous intensity of the second pixel 22, thereby improving overall brightness of the display panel 1, and ameliorating the undesirable phenomenon of yellowing in the peripheral portion of the display panel.

For example, in the first direction, the first pixel 21 may be located in the peripheral portions 101 on upper and lower sides of the display panel 1, so that the amplifier 41 may enhance luminous intensities of the blue sub-pixels 201 on the upper and lower sides of the display panel 1.

For example, as shown in FIG. 3, in the second direction, the first data line 31 connected with the blue sub-pixels 201 of each column may be connected with one amplifier 41. In the first direction, in the peripheral portions 101 on the upper and lower sides of the display panel 1, the luminous intensities of all the blue sub-pixels 201 in the same row may be relatively increased, thereby improving display uniformity in the upper and lower sides of the display panel.

It should be noted that, a quantity of the blue sub-pixels 201 connected with each first data line 31 may be determined according to actual requirements, which is not limited herein. For example, each first data line 31 is connected with ten blue sub-pixels 201 located in a corresponding column.

Figure 4:
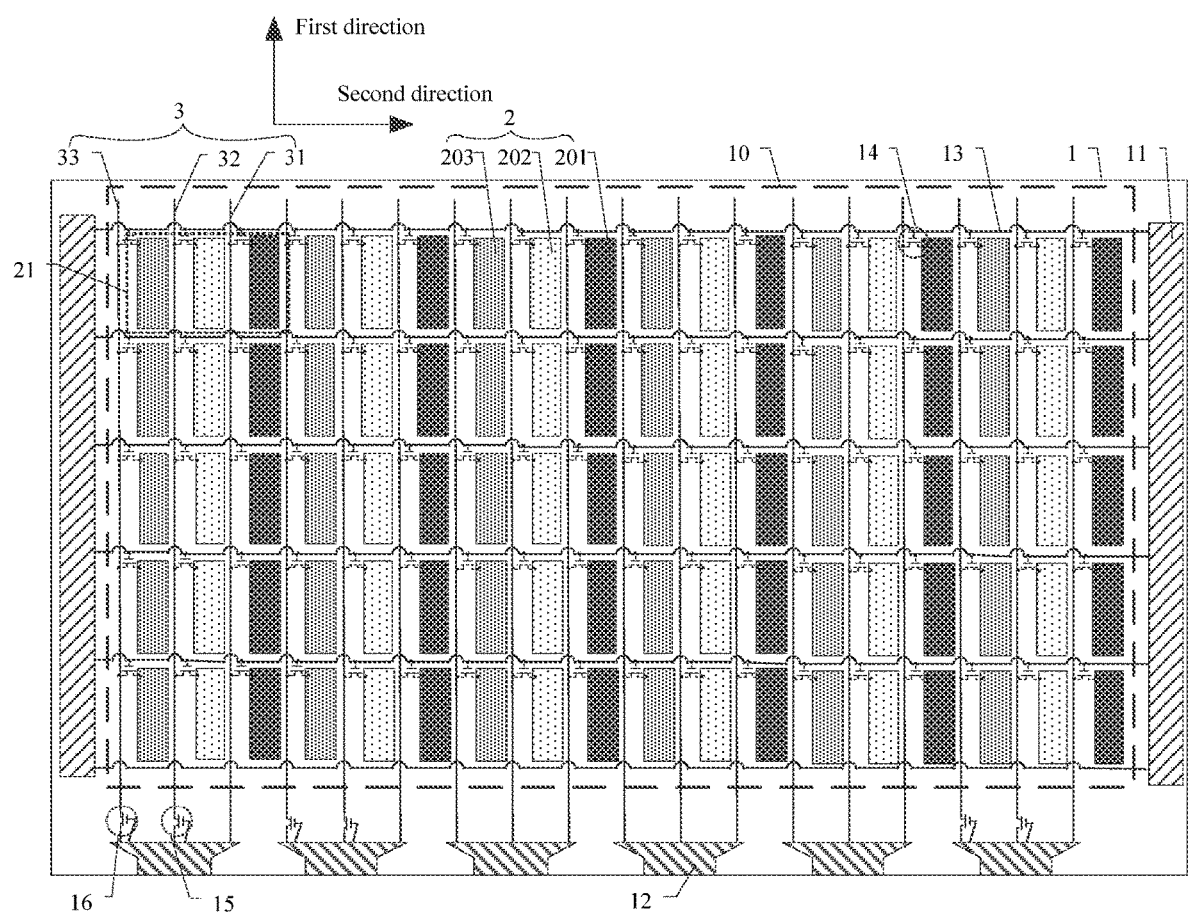
FIG. 4 is a structural schematic diagram of a liquid crystal display device provided by another example of an embodiment of the present disclosure.
Figure 5:
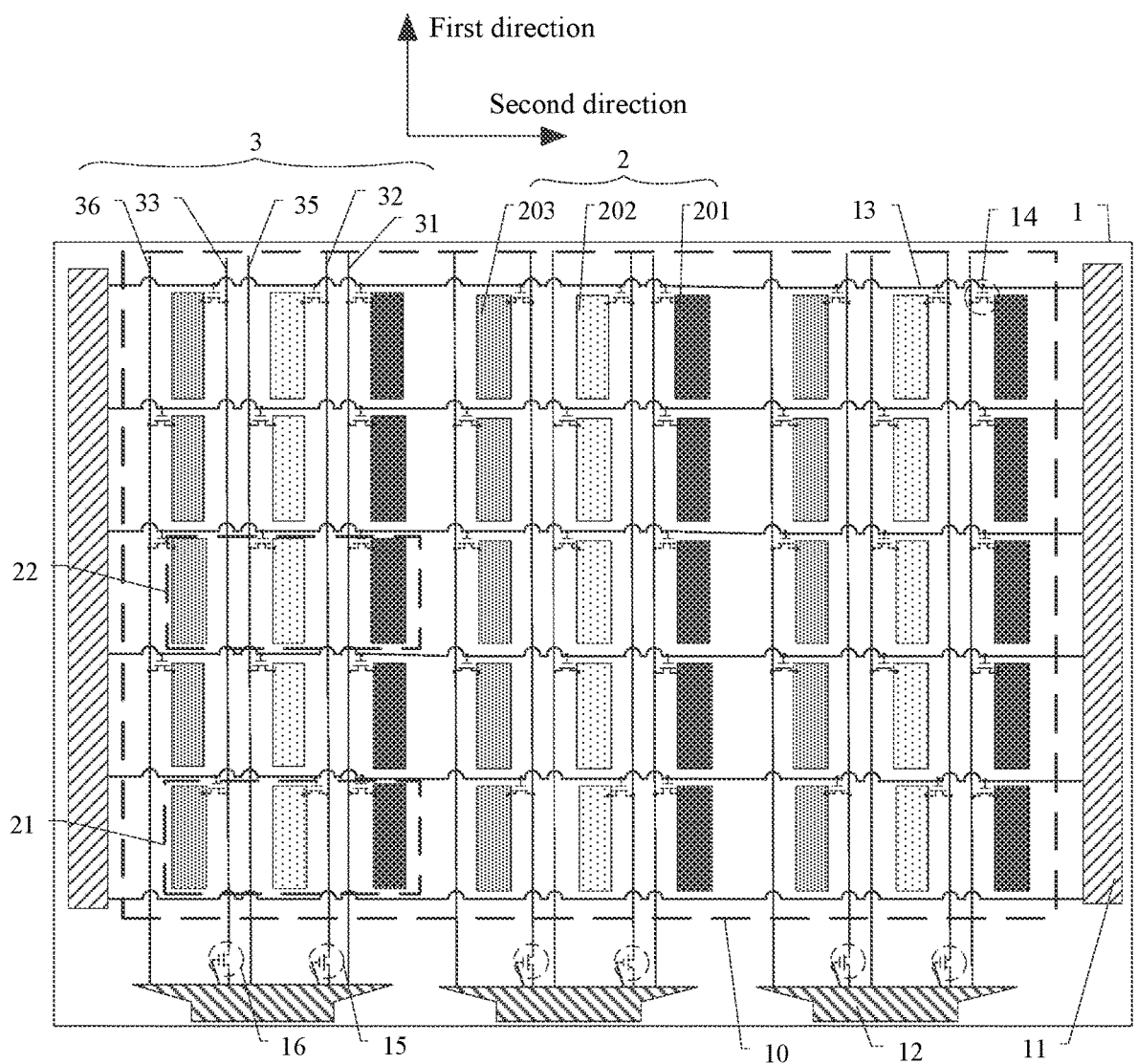
FIG. 5 is a structural schematic diagram of another liquid crystal display device provided by another example of an embodiment of the present disclosure.

FIG. 4 is a structural schematic diagram of a liquid crystal display device provided by another example of an embodiment of the present disclosure; FIG. 5 is a structural schematic diagram of another liquid crystal display device provided by another example of an embodiment of the present disclosure.

For example, as shown in FIG. 4, in another example of the embodiment of the present disclosure, the controller may include a signal control circuit, and the signal control circuit includes a first transistor 15 and a second transistor 16. An input terminal and an output terminal of the first transistor 15 are connected with the data drive circuit 12 and the second data line 32, respectively; an input terminal and an output terminal of the second transistor 16 are connected with the data drive circuit 12 and the third data line 33, respectively. In an operation of the liquid crystal display device, control terminals of the first transistor 15 and the second transistor 16 may be applied with control voltages, so as to adjust magnitude of the data signals applied to the second data line 32 and the third data line 33, respectively.

For example, the input terminal may be a source electrode of a transistor, and is used for inputting a signal; the output terminal may be a drain electrode of the transistor, and is used for outputting the signal; and the control terminal is a gate electrode of the transistor, and is used for receiving a control voltage, so as to control a working state of the transistor. However, considering symmetry of the source electrode and drain electrode of the transistor, the input terminal may also be the drain electrode of the transistor and the output terminal may be the source electrode of the transistor.

For example, the second data line 32 and the third data line 33 are respectively connected with a column of red sub-pixels 202 and a column of green sub-pixels 203, so that the first transistor 15 and the second transistor 16 may respectively control a column of red sub-pixels 202 and a column of green sub-pixel 203.

For example, the data drive circuit 12 may apply control voltages to the control terminal of the first transistor 15 and the control terminal of the second transistor 16, thereby controlling turn-on degrees of the first transistor 15 and the second transistor 16, so as to reduce data signals transmitted by the second data line 32 and the third data line 33, further reducing the luminous intensities of the red sub-pixel 202 and the green sub-pixel 203 in the first pixel 21. For example, the data drive circuit 12 may apply a first control voltage to the control terminal of the first transistor 15 and a second control voltage to the control terminal of the second transistor 16, and the first control voltage and the second control voltage may be same, so that the luminous intensity of the red sub-pixel 202 in the first pixel 21 and the luminous intensity of the green sub-pixel 203 in the first pixel 21 may be reduced by the same amplitude. The first control voltage and the second control voltage may also be different, and for example, because transmittance of a red filter and transmittance of a green filter are different, the luminous intensity of the red sub-pixel 202 and the luminous intensity of the green sub-pixel 203 are non-uniform. The luminous intensity of the red sub-pixel 202 in the first pixel 21 and the luminous intensity of the green sub-pixel 203 in the first pixel 21 may be adjust to different degrees by using different control voltages, so as to further improve display uniformity and improve display quality.

For example, the first transistors 15 connected with the second data lines 32 in different columns may be the same or different. The control voltages applied to the first transistors 15 by the data drive circuit 12 may be the same or different. Therefore, the first transistor 15 may adjust the luminous intensities of the red sub-pixels 202 in different columns to the same or different degrees, so as to meet different actual requirements.

It should be noted that the second transistor 16 and the first transistor 15 have similar structures and functions, and the difference therebetween is that the second transistor 16 is used for adjusting the luminous intensity of the green sub-pixel 202. Therefore, in the embodiments of the present disclosure, the related description of the first transistor 15 is also applicable to the second transistor 16 in case of no conflict, and the repeated description is omitted.

For example, as shown in FIG. 5, in another liquid crystal display device provided by the example, the plurality of data lines 3 further include a fifth data line 35 and a sixth data line 36, the fifth data line 35 and the sixth data line 36 also extend in the column direction. The fifth data line 35 and the sixth data line 36 are respectively connected with a red sub-pixel 202 and a green sub-pixel 203 in a second pixel 22. That is to say, in a same column, the red sub-pixel 202 in the first pixel 21 and the red sub-pixel 202 in the second pixel 22 are connected with the second data line 32 and the fifth data line 35, respectively; the green sub-pixel 203 in the first pixel 21 and the green sub-pixel 203 in the second pixel 22 are connected with the third data line 33 and the sixth data line 36, respectively. Therefore, unlike the liquid crystal display device shown in FIG. 4, the liquid crystal display device shown in FIG. 5 may control the first pixel 21 and the second pixel 22 in the same column respectively, so as to reduce the luminous intensities of the red sub-pixel 202 and the green sub-pixel 203 in the first pixel 21 individually.

For example, a quantity of the red sub-pixels 202 connected with each second data line 32 may be specifically determined according to actual requirements, and a quantity of the green sub-pixels 203 connected with each third data line 33 may also be determined specifically according to actual requirements, and the present disclosure is not limited thereto. For example, each second data line 32 is connected with 10 red sub-pixels 202 in a corresponding column; and each third data line 33 is also connected with 10 green sub-pixels 203 in a corresponding column.

For example, as shown in FIG. 4, in the first direction, the first pixel 21 may be located in the peripheral portions 101 on upper and lower sides of the display panel 1. Control terminals of the first transistor 15 and the second transistor 16 may be applied with control voltages, so as to adjust data signals on the second data line 32 and the third data line 33, respectively, thereby reducing the luminous intensities of the red sub-pixels 202 and the luminous intensities of the green sub-pixels 203 on the upper and lower sides of the display panel 1.

For example, in the second direction, the second data line 32 connected with the red sub-pixels 202 in each column may be connected with one first transistor 15; and the third data line 33 connected with the green sub-pixels 203 in each column may be connected with one second transistor 16. Therefore, in the first direction, in the peripheral portions 101 on the upper and lower sides of the display panel 1, the luminous intensities of all the red sub-pixels 202 and the green sub-pixels 203 in a same row may be reduced, thereby improving display uniformity in the upper and lower sides of the display panel.

For example, the first transistor 15 and the second transistor 16 may be N-type transistors, or may be P-type transistors, provided that a level of the control voltage of the control terminal of the transistor is adjusted. For example, for an N-type transistor, the N-type transistor is turned on when the control voltage is at a high level, and for a P-type transistor, the P-type transistor is turned on when the control voltage is at a low level.

It should be noted that, in the above examples of the embodiment of the present disclosure, the signal control circuit may be provided on the display panel 1, for example, the signal control circuit may be formed on an array substrate, or the signal control circuit may be provided on a printed circuit board (e.g., a flexible printed circuit board) signally connected with the array substrate.

Figure 6A:
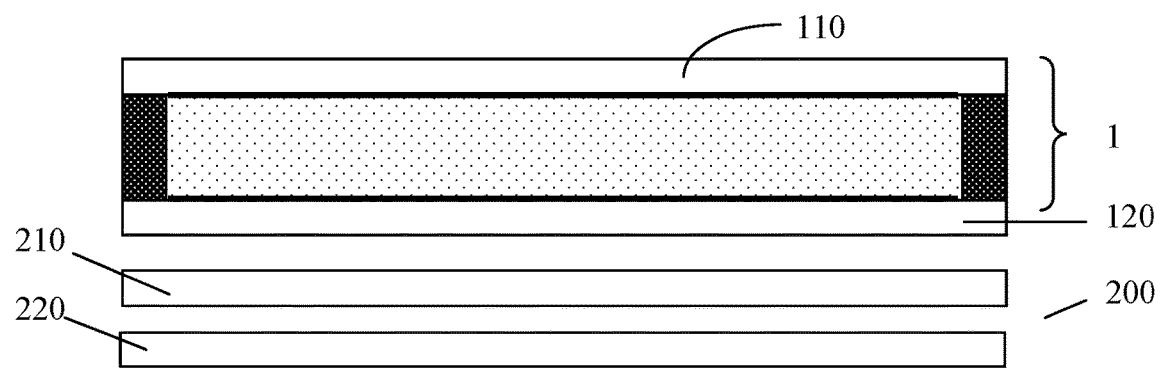
FIG. 6A is a structural schematic diagram of a liquid crystal display device provided by still another example of an embodiment of the present disclosure.

For example, in yet another example of the embodiment of the present disclosure, as shown in FIG. 6A, the controller may be connected with a backlight source 200 disposed on a side (a back side) of the display panel 1, and the backlight source 200, for example, is a straight-down type backlight source and is a dynamic backlight source. The display panel 1 includes an array substrate 120 and an opposed substrate 110, for example, the opposed substrate is a color filter substrate. The backlight source 200 includes a light guide plate 210 and a light emitting unit array 220.

Figure 6B:
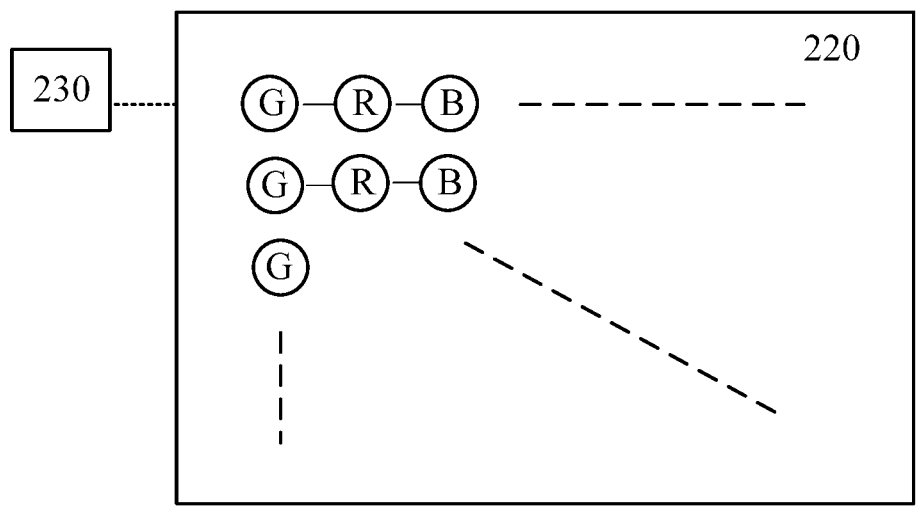
FIG. 6B is a plan structural schematic diagram of a backlight source provided by an embodiment of the present disclosure.

For example, as shown in FIG. 6B, the light emitting unit array 220 includes a plurality of light emitting units arranged in an array, and for example, the light-emitting units include a red light unit (R), a green light unit (G) and a blue light unit (B), and these units are combined to emit white light. These light-emitting units may be light-emitting diodes (LEDs) such as inorganic LEDs or organic LEDs. At least part of these light-emitting units, for example, may be controlled individually. For example, the light emitting unit array 220 may include a middle region and a peripheral region, and the middle region and the peripheral region respectively correspond to the middle portion 102 and the peripheral portion 101 of the display region 10 of the display panel 1. That is to say, in a direction perpendicular to the array substrate 120, the middle region of the light emitting unit array 220 overlaps with the middle portion 102 of the display region 10, and the peripheral region of the light emitting unit array 220 overlaps with the peripheral portion 101 of the display region 10. The dynamic backlight source includes a blue light unit corresponding to the blue sub-pixel 201 of the first pixel 21 in the peripheral portion 101 of the display panel 1. The blue light unit is configured to have a relatively increased luminous intensity, so that a blue light component of the white light emitted by the dynamic backlight source in at least part of the peripheral portion 101 is relatively increased.

For example, the dynamic backlight source may correspond to the entire display panel 1, so that the luminous intensities of all the sub-pixels in the pixels 2 in the display panel 1 may be adjusted; or the dynamic backlight source may only include the blue light unit corresponding to the blue sub-pixel 201 in the first pixel 21, so that the luminous intensity of the blue sub-pixel 201 in the first pixel 21 may be adjusted individually, thereby saving production cost.

For example, as shown in FIG. 6B, the controller may further include a backlight source drive circuit 230, and the backlight source drive circuit 230 is connected with the backlight source 200. The backlight source drive circuit 230 is configured to control a blue light unit to emit light, so that the blue light unit has relatively increased luminous intensity with respect to other backlight units in the dynamic backlight source. The other backlight units, for example, may comprise a red light unit and a green light unit, and may also comprise a white light unit.

For example, the backlight source drive circuit 230 may be integrated on a printed circuit board. For example, in one example, the backlight source drive circuit 230 may be controlled by the same timing control signal as the gate driver 11, so that when the gate driver 11 drives the first pixel 21 to display, the backlight source drive circuit 230 controls the blue light unit to emit light at the same time, so as to enhance the luminous intensity of the blue sub-pixel 201 in the first pixel 21, thereby improving a display effect of edges of a display panel and improving display quality.

For example, in yet another example of the embodiment of the present disclosure, the controller may include a data drive circuit. Referring to FIG. 1, the data drive circuit 12 may be disposed on a side of the display panel 1 of the liquid crystal display device, and may be connected with pixels in the display panel 1, so as to provide data signals for the pixels. In the example, the data drive circuit 12 is configured to transmit the relatively increased grayscale voltage to the blue sub-pixel in the first pixel in the peripheral portion of the display panel, so that the luminous intensity of the blue sub-pixel in the first pixel is relatively increased.

Figure 7:
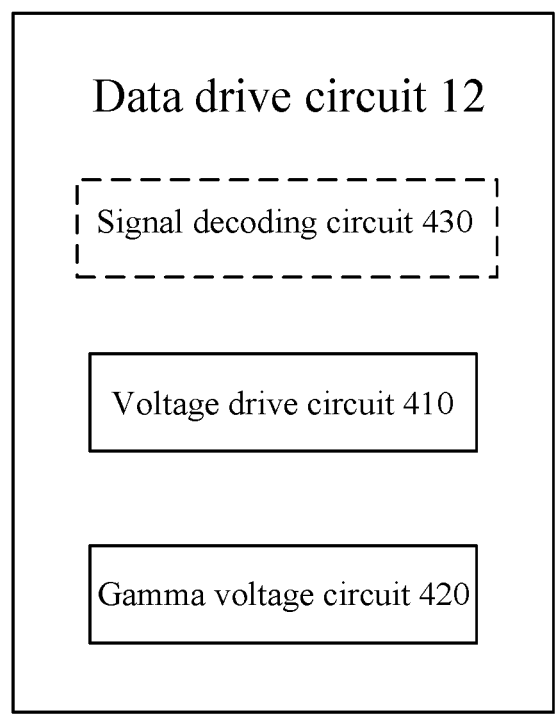
FIG. 7 is a block diagram of a data drive circuit provided by an embodiment of the present disclosure.

For example, as shown in FIG. 7, in one example, the data drive circuit 12 may include a voltage drive circuit 410 and a gamma voltage circuit 420. The gamma voltage circuit 420 is configured to generate a grayscale voltage according to the input display data; and the voltage drive circuit 410 is configured to relatively increase the grayscale voltage transmitted to the blue sub-pixel 201 in the first pixel 21. In another example, the data drive circuit 12 may further include a signal decoding circuit 430, and the signal decoding circuit 430 is used for decoding a video signal or an image signal received from a signal source (e.g., a modem) to obtain display data, and for providing the display data to the gamma voltage circuit 420.

For example, the voltage drive circuit 410 may include an amplification circuit and the like, and the amplification circuit, for example, may include an operational amplifier and the like.

For example, the liquid crystal display device may be a liquid crystal panel, an electronic paper, a liquid crystal television, a liquid crystal display, a digital photo frame, a mobile phone, a tablet computer, etc.

It should be noted that the above examples of the embodiments of the present disclosure may be combined with each other to obtain new embodiments without any contradiction, and all possible embodiments are included within the scope defined by the claims of the present disclosure.

It should be noted that, although not specifically described, those skilled in the art may understand that, the controller may also be implemented by a processor having a logic operation function, and related operation instructions are executed on the processor to perform the functions of the above-described controller. For example, the processor may be a general-purpose central processing unit CPU, the CPU performs the functions of the controller by connecting circuits of related components to a bus of the CPU; for example, the processor may be a dedicated processor, e.g., a microcontroller CPU, a programmable logic array FPGA, an application-specific integrated circuit ASIC and the like designed for the purpose including performing the functions of the above-described controller, and the functions of the controller may be performed by connecting the circuits of the related components with pins of the dedicated processor.

An embodiment of the present disclosure further provides an array substrate, and the array substrate may be applied to the liquid crystal display device described in any one of the embodiments of the present disclosure.

For example, the array substrate includes a base substrate and a plurality of pixels arranged on the base substrate. The base substrate comprises a display region, and the display region includes a middle portion and a peripheral portion outside the middle portion. The plurality of pixels are arranged in an array in the display region, each pixel includes a red sub-pixel, a blue sub-pixel and a green sub-pixel, and at least one first pixel of the plurality of pixels 2 is provided in the peripheral portion.

For example, the array substrate further includes a plurality of data lines and a signal control circuit. The plurality of data lines include a first data line, a second data line, and a third data line. The first data line is connected with the blue sub-pixel in the first pixel, the second data line is connected with a red sub-pixel in the first pixel, and the third data line is connected with a green sub-pixel in the first pixel. The signal control circuit is connected with the plurality of data lines and is configured to control magnitude of the data signals transmitted from the plurality of data lines to the first pixel, so as to adjust luminous intensities of respective sub-pixels in the first pixel.

For the arrangement of the signal control circuit provided by the embodiment of the present disclosure, reference may be made to the related description in the embodiments of the liquid crystal display device described above, and the repeated description is omitted. The signal control circuit in the embodiment of the present disclosure is disposed on the array substrate.

An embodiment of the present disclosure further provides a dynamic backlight source, and the dynamic backlight source may be applied to the liquid crystal display device described in any one of the embodiments of the present disclosure.

For example, the dynamic backlight source includes a middle portion and a peripheral portion outside the middle portion, and the peripheral portion includes a first backlight unit. The first backlight unit is configured to have a relatively increased luminous intensity.

For example, the dynamic backlight source further includes a backlight source drive circuit. The backlight source drive circuit is configured to control the first backlight unit to emit light, so that the first backlight unit has a relatively increased luminous intensity with respect to other backlight units in the dynamic backlight source.

For example, the first backlight unit may be a blue light unit, and other backlight units may comprise a red light unit or a green light unit. The other backlight units may also comprise a white light unit.

An embodiment of the present disclosure further provides a data drive circuit, and the data drive circuit be applied to the liquid crystal display device described in any one of the embodiments of the present disclosure.

For example, each pixel includes a first sub-pixel, a second sub-pixel and a third sub-pixel, and the data drive circuit is configured to transmit a relatively increased grayscale voltage to the first sub-pixel.

For example, the data drive circuit may include a voltage drive circuit and a gamma voltage circuit. The gamma voltage circuit is configured to generate a grayscale voltage according to the input display data; the voltage drive circuit may increase the grayscale voltage transmitted to the first sub-pixel, so as to increase a luminous intensity of the first sub-pixel; and the voltage drive circuit may also reduce the grayscale voltages transmitted to the second sub-pixel and the third sub-pixel, so that the luminous intensities of the second sub-pixel and the third sub-pixel are reduced.

For example, the data drive circuit may also include a signal decoding circuit. The signal decoding circuit decodes the received video signal or image signal to obtain display data, and supplies the display data to the gamma voltage circuit.

For example, the data drive circuit may further include an output buffer amplifier. The gamma voltage circuit may include a digital-to-analog conversion circuit, and the digital-to-analog conversion circuit is used for converting the input display data signal to an analog voltage, and the analog voltage is a grayscale voltage of a corresponding pixel. The voltage drive circuit may receive an analog voltage of the first sub-pixel output from the digital-to-analog conversion circuit, and amplify the analog voltage of the first sub-pixel. The amplified analog voltage is transmitted to the output buffer amplifier through a grayscale voltage path, so as to drive a load (i.e., the first sub-pixel) connected with the data line.

For example, the output buffer amplifier is used to further amplify the analog signal to drive a large capacitive load connected with the data line, for example, the large capacitive load has a $10^2$ pF capacitance level. The output buffer amplifier may include a two-stage operational amplifier structure, a first stage operational amplifier structure may be a differential amplifier, and a second stage operational amplifier structure may be an output operational amplifier. Both of the two operational amplifier structures have a bias circuit, the larger a bias current is, the stronger drive capability of the output buffer amplifier is.

For example, the first sub-pixel may be a blue sub-pixel, and the second sub-pixel and the third sub-pixel may be a red sub-pixel and a green sub-pixel, respectively.

For example, the data drive circuit may be a digital driver or an analog driver, the voltage drive circuit may include an amplifying circuit and the like, and the amplifying circuit, for example, may include an operational amplifier and the like.

An embodiment of the present disclosure also provides a drive method of the liquid crystal display device according to any one of the embodiments of the present disclosure.

For example, the drive method provided by the embodiment of the present disclosure comprises following operations: increasing a luminous intensity of a blue sub-pixel in a first pixel, and/or reducing the luminous intensities of other sub-pixels in the first pixel, so as to relatively increase the luminous intensity of the blue sub-pixel in the first pixel with respect to the other sub-pixels in the first pixel.

For example, the other sub-pixels may include a red sub-pixel and a green sub-pixel, and may further include a white sub-pixel.

For example, in one example, the drive method comprises: increasing a data signal applied to a data line connected with the blue sub-pixel in the first pixel, so as to relatively increase the luminous intensity of the blue sub-pixel.

For example, the liquid crystal display device may include a data drive circuit, an amplifier and a first data line, and the first data line is connected with the blue sub-pixel in the first pixel. Thus, in one example, the drive method may comprise: increasing a data signal applied to the first data line by driving the amplifier through the data drive circuit.

For example, in another example, the drive method may comprise: reducing data signals applied to data lines connected with the other sub-pixels in the first pixel, so as to reduce luminous intensities of the other sub-pixels in the first pixel.

For example, the liquid crystal display device may include a data drive circuit, a first transistor, a second transistor, a second data line and a third data line, and an input terminal and an output terminal of the first transistor are respectively connected with the data drive circuit and the second data line, and an input terminal and an output terminal of the second transistor are respectively connected with the data drive circuit and the third data line. Thus, in another example, the drive method may comprise: controlling gate voltage of the first transistor and gate voltage of the second transistor by using the data drive circuit, so as to reduce data signals applied to the second data line and the third data line. That is to say, the data drive circuit may control turn-on degrees of the first transistor and the second transistor, to make the turn-on degrees thereof small, so that the data signals flowing through the first transistor and the second transistor are reduced, i.e., the data signals applied to the second data line and the third data line are reduced.

For example, in yet another example, the liquid crystal display device may include a dynamic backlight source, and the dynamic backlight source includes a blue light unit corresponding to the blue sub-pixel in the first pixel. Thus, in yet another example, the drive method may comprise: controlling the blue light unit to emit light by using the backlight source drive circuit, so that the blue sub-pixel in the first pixel has an increased luminous intensity with respect to the other sub-pixels in the first pixel.

For example, the liquid crystal display device may further comprise a data drive circuit. The data drive circuit includes a voltage drive circuit and a gamma voltage circuit. The gamma voltage circuit is configured to generate a grayscale voltage according to the input display data; and the voltage drive circuit is configured to relatively increase the grayscale voltage transmitted to the blue sub-pixel in the first pixel. Therefore, in yet another example, the drive method may comprise: increasing the grayscale voltage transmitted to the blue sub-pixel in the first pixel by using the voltage drive circuit, thereby increasing the luminous intensity of the blue sub-pixel in the first pixel; alternatively, reducing the grayscale voltages transmitted to the other sub-pixels in the first pixel by the voltage drive circuit, thereby reducing luminous intensities of the other sub-pixels in the first pixel than the blue sub-pixel.

For the present disclosure, the following statements should be noted:

(1) the accompanying drawings in the embodiments of the present disclosure involve only the structure(s) in connection with the embodiment(s) of the present disclosure, and other structure(s) can be referred to in common design(s); and (2) in case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

What is claimed is:

1. A liquid crystal display device, comprising: a display panel and a controller, wherein the display panel comprises a display region, a plurality of pixels arranged in a matrix are provided in the display region, each of the plurality of pixels comprises a red sub-pixel, a blue sub-pixel, and a green sub-pixel, and the display region comprises a middle portion and a peripheral portion outside the middle portion, and at least one first pixel of the plurality of pixels is provided in the peripheral portion, and the controller is configured to relatively increase a luminous intensity of a blue sub-pixel in the first pixel, so that the luminous intensity of the blue sub-pixel in the first pixel is relatively increased with respect to other sub-pixels in the first pixel, wherein the luminous intensity of the blue sub-pixel in the first pixel being relatively increased with respect to the other sub-pixels in the first pixel comprises:

increasing the luminous intensity of the blue sub-pixel in the first pixel in a case where luminous intensities of the other sub-pixels in the first pixel are maintained at predetermined normal grayscales corresponding to the other sub-pixels; or reducing luminous intensities of the other sub-pixels in the first pixel in a case where the luminous intensity of the blue sub-pixel in the first pixel is maintained at a predetermined normal grayscale corresponding to the blue sub-pixel; or increasing the luminous intensity of the blue sub-pixel in the first pixel with respect to a predetermined normal grayscale corresponding to the blue sub-pixel while reducing luminous intensities of the other sub-pixels in the first pixel with respect to predetermined normal grayscales corresponding to the other sub-pixels, wherein a predetermined normal grayscale corresponding to each sub-pixel in the first pixel refers to a grayscale that is shown by the each sub-pixel before a processing operation is performed on the liquid crystal display device to avoid a problem of yellowing in the peripheral portion.

2. The liquid crystal display device according to claim 1, further comprising: a plurality of data lines and a data drive circuit,
wherein the controller comprises a signal control circuit,
the plurality of data lines include a first data line, a second data line, and a third data line, the first data line is connected with the blue sub-pixel in the first pixel, and the second data line is connected with a red sub-pixel in the first pixel, and the third data line is connected with a green sub-pixel in the first pixel;
the data drive circuit is configured to apply data signals to the plurality of data lines; and
the signal control circuit is arranged between the data drive circuit and the plurality of data lines, and is configured to control magnitudes of the data signals transmitted from the plurality of data lines to the first pixel, so as to adjust luminous intensities of respective sub-pixels in the first pixel.

3. The liquid crystal display device according to claim 2, wherein the signal control circuit comprises an amplifier,
an input terminal of the amplifier is connected with the data drive circuit, an output terminal of the amplifier is connected with the first data line, and the amplifier is configured to amplify a data signal applied to the first data line.

4. The liquid crystal display device according to claim 2, wherein the signal control circuit comprises a first transistor and a second transistor,
an input terminal and an output terminal of the first transistor are connected with the data drive circuit and the second data line respectively;
an input terminal and an output terminal of the second transistor are connected with the data drive circuit and the third data line respectively; and
control terminals of the first transistor and the second transistor are configured to be applied with control voltages to respectively adjust magnitudes of data signals applied to the second data line and the third data line.

5. The liquid crystal display device according to claim 2, wherein at least one second pixel of the plurality of pixels is further provided in the peripheral portion or the middle portion,
the plurality of data lines extend along a column direction of the plurality of pixels and further include a fourth data line, a blue sub-pixel in the second pixel and the blue sub-pixel in the first pixel are in a same column, and the fourth data line is connected with the blue sub-pixel in the second pixel.

6. The liquid crystal display device according to claim 2, wherein at least one second pixel of the plurality of pixels is further provided in the peripheral portion or the middle portion,
the plurality of data lines extend in a column direction of the plurality of pixels and further include a fifth data line and a sixth data line, the second pixel and the first pixel are in a same column, the fifth data line is connected with a red sub-pixel in the second pixel, and the sixth data line is connected with a green sub-pixel in the second pixel.

7. The liquid crystal display device according to claim 1, wherein the controller is connected with a dynamic backlight source,
the dynamic backlight source comprises a blue light unit corresponding to the blue sub-pixel in the first pixel, and the blue light unit is configured to have a relatively increased luminous intensity.

8. The liquid crystal display device according to claim 7, wherein the controller further comprises a backlight source drive circuit, the backlight source drive circuit is connected with the dynamic backlight source, the dynamic backlight source further comprises other backlight units than the blue light unit,
the backlight source drive circuit is configured to control the blue light unit to emit light, so that the blue light unit has the relatively increased luminous intensity with respect to the other backlight units in the dynamic backlight source.

9. The liquid crystal display device according to claim 1, wherein the controller comprises a data drive circuit,
the data drive circuit is configured to transmit a relatively increased grayscale voltage to the blue sub-pixel in the first pixel.

10. The liquid crystal display device according to claim 9, wherein the data drive circuit comprises a voltage drive circuit and a gamma voltage circuit,
the gamma voltage circuit is configured to generate a grayscale voltage according to input display data, and the voltage drive circuit is configured to relatively increase the grayscale voltage transmitted to the blue sub-pixel in the first pixel.

11. A drive method of the liquid crystal display device according to claim 1, comprising:
increasing the luminous intensity of the blue sub-pixel in the first pixel and reducing the luminous intensities of the other sub-pixels in the first pixel, so as to relatively increase the luminous intensity of the blue sub-pixel in the first pixel with respect to the other sub-pixels in the first pixel; or
increasing the luminous intensity of the blue sub-pixel in the first pixel or reducing the luminous intensities of the other sub-pixels in the first pixel, so as to relatively increase the luminous intensity of the blue sub-pixel in the first pixel with respect to the other sub-pixels in the first pixel.

12. The drive method according to claim 11, wherein a data signal applied to a data line connected with the blue sub-pixel in the first pixel is increased.

13. The drive method according to claim 11, wherein data signals applied to data lines connected with the other sub-pixels in the first pixel except the blue sub-pixel in the first pixel are reduced.

14. The drive method according to claim 11, wherein in a case where the liquid crystal display device comprises a dynamic backlight source, the dynamic backlight source comprises a blue light unit corresponding to the blue sub-pixel in the first pixel,
the drive method comprises:
controlling the blue light unit to emit light, so that the blue sub-pixel in the first pixel has an increased luminous intensity with respect to the other sub-pixels in the first pixel.

15. The drive method according to claim 11, wherein a grayscale voltage transmitted to the blue sub-pixel in the first pixel is increased.

16. The liquid crystal display device according to claim 3, wherein at least one second pixel of the plurality of pixels is further provided in the peripheral portion or the middle portion,
the plurality of data lines extend along a column direction of the plurality of pixels and further include a fourth data line, a blue sub-pixel in the second pixel and the blue sub-pixel in the first pixel are in a same column, and the fourth data line is connected with the blue sub-pixel in the second pixel.

17. The liquid crystal display device according to claim 4, wherein at least one second pixel of the plurality of pixels is further provided in the peripheral portion or the middle portion,
- the plurality of data lines extend along a column direction of the plurality of pixels and further include a fourth data line, a blue sub-pixel in the second pixel and the blue sub-pixel in the first pixel are in a same column, and the fourth data line is connected with the blue sub-pixel in the second pixel.

18. The liquid crystal display device according to claim 3, wherein at least one second pixel of the plurality of pixels is further provided in the peripheral portion or the middle portion,
- the plurality of data lines extend in a column direction of the plurality of pixels and further include a fifth data line and a sixth data line, the second pixel and the first pixel are in a same column, the fifth data line is connected with a red sub-pixel in the second pixel, and the sixth data line is connected with a green sub-pixel in the second pixel.

19. The liquid crystal display device according to claim 4, wherein at least one second pixel of the plurality of pixels is further provided in the peripheral portion or the middle portion,
- the plurality of data lines extend in a column direction of the plurality of pixels and further include a fifth data line and a sixth data line, the second pixel and the first pixel are in a same column, the fifth data line is connected with a red sub-pixel in the second pixel, and the sixth data line is connected with a green sub-pixel in the second pixel.

20. The liquid crystal display device according to claim 2, wherein the controller is connected with a dynamic backlight source,
- the dynamic backlight source comprises a blue light unit corresponding to the blue sub-pixel in the first pixel, and the blue light unit is configured to have a relatively increased luminous intensity.

* * * * *